US011623225B2

(12) United States Patent
Ciechulski

(10) Patent No.: US 11,623,225 B2
(45) Date of Patent: Apr. 11, 2023

(54) METHOD OF SEPARATING GRAINS OF VALUABLE MINERALS, PRECIOUS METALS, RARE-EARTH METALS, PRECIOUS AND SEMI-PRECIOUS STONES FROM NATURAL ORES IN THE AQUATIC ENVIRONMENT BY MEANS OF THE PHENOMENON OF ADHESION

(71) Applicant: Andrzej Ciechulski, Warsaw (PL)

(72) Inventor: Andrzej Ciechulski, Warsaw (PL)

( * ) Notice: Subject to any disclaimer, the term of this patent is extended or adjusted under 35 U.S.C. 154(b) by 0 days.

(21) Appl. No.: 17/638,165

(22) PCT Filed: Aug. 17, 2020

(86) PCT No.: PCT/PL2020/000069
§ 371 (c)(1),
(2) Date: Feb. 24, 2022

(87) PCT Pub. No.: WO2021/040546
PCT Pub. Date: Mar. 4, 2021

(65) Prior Publication Data
US 2022/0266260 A1 Aug. 25, 2022

Related U.S. Application Data

(63) Continuation of application No. PCT/PL2020/000069, filed on Aug. 17, 2020.

(30) Foreign Application Priority Data

Aug. 28, 2019 (PL) .......................... 430975

(51) Int. Cl.
*B03B 5/60* (2006.01)
*B03B 9/00* (2006.01)
(52) U.S. Cl.
CPC . *B03B 5/60* (2013.01); *B03B 9/00* (2013.01)

(58) Field of Classification Search
CPC ................................... B03B 5/60; B03B 9/00
(Continued)

(56) References Cited

U.S. PATENT DOCUMENTS

| 6,896,808 B1 * | 5/2005 | Jay | .......................... C22B 3/24 |
| | | | 210/651 |
| 2017/0080403 A1 * | 3/2017 | Rothman | .................. C02F 1/24 |

FOREIGN PATENT DOCUMENTS

| PL | 228374 B1 | 10/2012 |
| PL | 414824 A1 | 11/2015 |

(Continued)

OTHER PUBLICATIONS

Written Opinion of the International Searching Authority and International Search Report issued by the Patent Office of the Republic of Poland for corresponding International Patent Application No. PCT/PL2020/000069, dated Dec. 29, 2020.

*Primary Examiner* — Terrell H Matthews
(74) *Attorney, Agent, or Firm* — Myers Wolin, LLC

(57) ABSTRACT

A method of separating grains of valuable minerals, precious metals, rare-earth metals, precious and semi-precious stones from natural ores in the aquatic environment by means of the phenomenon of adhesion, consecutively covering stages such as: initial separation consisting in sieving fractions up to 5000 μm from alluvial (rubble) ore or crushing primary (rock) ore to a fraction causing the separation of valuable minerals from gangue and where appropriate separating ferromagnetics from ores by means of a known method; forming the suspension by mixing the initially separated fraction of ore with liquid; adsorption of valuable minerals from the suspension on the adhesive coating and also recovering water from the process; and desorption of particles of valuable minerals from the adhesive coating; wherein lanolin or its mixtures with additives are used to (Continued)

form the adhesive coating in the separator, whereby, the content of lanolin in the mixture is not less than 80%.

16 Claims, 1 Drawing Sheet

(58) Field of Classification Search
USPC .......................................................... 209/17
See application file for complete search history.

(56) References Cited

FOREIGN PATENT DOCUMENTS

| | | | |
|---|---|---|---|
| PL | 414824 A1 * | 5/2017 | |
| PL | 228374 B1 * | 3/2018 | |
| RU | 2054330 C1 | 2/1995 | |
| RU | 2054330 C1 * | 2/1996 | |
| WO | 01/34856 A1 | 5/2001 | |
| WO | WO-0134856 A1 * | 5/2001 | ............. C22B 11/04 |
| WO | 2018085490 A1 | 5/2018 | |

\* cited by examiner

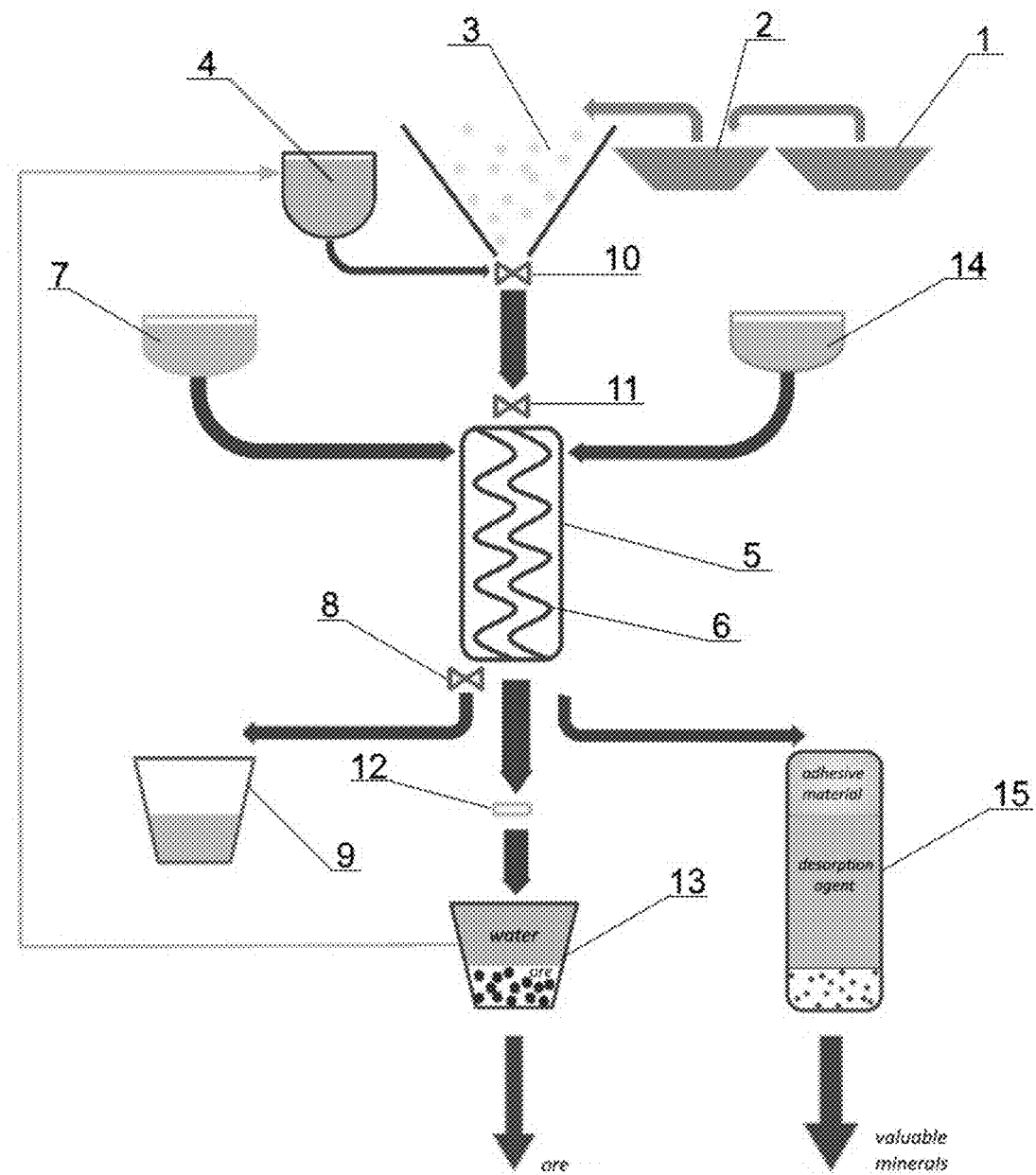

METHOD OF SEPARATING GRAINS OF VALUABLE MINERALS, PRECIOUS METALS, RARE-EARTH METALS, PRECIOUS AND SEMI-PRECIOUS STONES FROM NATURAL ORES IN THE AQUATIC ENVIRONMENT BY MEANS OF THE PHENOMENON OF ADHESION

CROSS-REFERENCE TO RELATED APPLICATION

This application is a national stage application of International Application PCT/PL2020/000069, filed Aug. 17, 2020 and designated the U.S., which claims priority to Polish Patent Application No. P.430975, filed Aug. 28, 2019, the contents of the aforementioned applications are incorporated herein by reference in their entirety.

The subject of the present disclosure is the method of separating grains of valuable minerals, precious metals, rare-earth metals, precious and semi-precious stones from natural ores in the aquatic environment by means of the phenomenon of adhesion. The method is appropriated for recovering grains of valuable minerals from 1 to 5000 μm, whereby, the expression "valuable minerals" implies precious metals, rare-earth metals, precious and semi-precious stones. At least one embodiment of the present disclosure applies, above all, to the separation of gold which does not limit the scope of its application.

Global mining recognizes methods of recovering gold from ores based on:
- chemical methods (ca. 80% of the world market) using the phenomenon of digesting precious metals in strong chemical compounds. Mainly cyanide compounds and mercury are used in these methods. These methods are highly efficient as regards the percentage of extracted metals from ores, but they are expensive and also toxic and cause environmental pollution (often on a scale of ecological disasters), therefore they are prohibited in a growing number of countries.
- gravity methods (ca. 20% of the global market) using the high specific gravity of precious metals consisting in leaching minerals with a lower specific gravity, which is characteristic for precious metals, in special washing plants and depositing grains of the separated metals on special mats or their separation in rotating devices (hydrocyclones and others).

These methods are relatively cheap, but not very effective as regards the percentage of the recovery. On average the ores contain only ca 20% of precious metals. These are grain fractions exceeding 500 micrones and the smaller fractions ("gold dust") below the "gravitational recovery threshold" are lost at industrial scale.
- adhesion methods involving the use of phenomena occurring on the surface of materials. These methods, such as gravity methods are not effective due to technological barriers.

In the state of the art there are a lot of ways to separate valuable minerals based on the phenomenon of adhesion.

For instance patent PL228374 presents the method of separating platinum, palladium and gold from aqueous solutions containing chloride ions by using as an adsorbent activated charcoal which is characterized by the fact that 1 gram of activated charcoal per 25 mg of palladium and platinum and/or gold is added to the chloride aqueous solution with a concentration of Cl-ions in the range from 0.1-1.0 mol/dm$^3$, containing palladium (II) ions (II) and platinum (IV) ions and or gold (III) ions and after the adsorption of palladium (II) ions and platinum (IV) ions and/or gold (III) ions on the surface of the activated charcoal, the solution containing palladium (II) ions is filtrated in order to separate activated charcoal on the surface of which palladium (II) ions and platinum (IV) ions and/or gold (III) ions were adsorbed, after which the separated activated charcoal is washed with hydrochloric acid with a concentration not lower than 1% which causes a selective desorption of palladium (II) ions which are taken into the solution from which they are recovered by known methods, however, platinum and gold formed on the surface of the activated charcoal are further processed, favourably molten.

In turn the Polish patent application P.414824 deals with an adsorbent for recovering precious metals from deposits. The application covers the use of the adsorbent for recovering and evaluating the deposits of precious metals and minerals with hydrophobic properties. The adsorbent is distinctive because it consists of components: solid and liquid binder solution, whereby, the solid component in the form of granulate or mats made of polyethylene having strong hydrophobic properties or from polypropylene or polyethylene terephthalate (PET) or polyvinylchloride or polyamide or nylon or rubber material or silicon material as a hydrophobic substance and magnetite or other metals, their alloys or compounds with strong ferromagnetic properties or $NiFe_2O_3$ or $CuOF_2O$ or $MgO$ or $Y_3Fe_5O_{12}$ or $Cu_2MnAl$ or $Cu_2Mn1L$ or $CrO_2$ or iron alloys with nickel, cobalt, aluminum or rare-earth metals in proportion 25-35, favourably 30% weight percent of the material and 75-65, favourably 70 weight percent of magnetite, however, the liquid binder solution consists of a hydrocarbon mixture: bitumen, diesel oil or kerosene or synthetic oil or ECO-C fuel oil with similar viscosity properties in proportion of 2.16 part of weight of the bitumen weight and 1 part of weight of diesel oil, after which the liquid binder solution is deposited in water on the solid component at a 3.5-4.5 weight percent of the binder on the surface of the component. By applying this method the binder was leached too rapidly and the method has become problematic in industrial production.

Patent application US20170080403 deals with a method of recovering valuable minerals, including gold involving hydrophobic polymer surfaces and in the course thereof mineral particles being the subject of interest from suspension in the process of mineral extraction are recovered on the stem or substrate on which multiple layers are spread, whereby, each layer is configured with a suitable external surface having a lot of particles attached to it, whereby, the particles contain a function group chosen to attract and attach one or more mineral particles being the object of interest. Each layer is made of polymer of a thickness lower or equal to ca. 125 micrones. The polymer is chosen from a group including polydimethylsiloxane or dimethylsiloxane.

Likewise patent application WO 2018085490 presents a substrate used in an aqueous suspension which has a polymer coating for ensuring a susceptible and tacky surface. The polymer coating contains a chemical substance which enables the hydrophobic surface to attract hydrophobic or hydrophobized mineral particles in the suspension. The substrate may take the form of a conveyor belt, a ball, a grid, an impeller, a filter or a flat surface. Open-cell foam can also be a substrate. The polymer coating can be modified with binders; placticizers; cross-linking agents; chain transfer agents; chain extenders; anchoring agents; aryl or alkyl copolymers; fluorinated copolymers and/or additives; hydrophobing agents such as hexamethyldisilazane; inorganic particles such as silica, hydrophobic silica and/or fumed hydrophobic silica; MQ resin and/or other additives for monitoring and modifying the properties of the polymer.

Despite undertaking numerous attempts as regards the recovery of grains of precious metals and minerals from natural ores by adhesion methods, none of these methods have been industrially applied, due to the technological barriers, out of which the most essential are: lack of long-term operation capacity of materials used in the aquatic environment, poor abrasion resistance, low adhesion forces, problems with the efficient method of desorption of separated grains of precious metals and minerals on an industrial scale and also a small range of recovered fractions. Moreover, the majority of adhesion methods is not ecological.

Various approaches have been applied to solve technological problems by using flotation methods by means of the phenomenon of adhesion of grains of precious metals on the surface of gas bubbles formed in flotation columns in which an aqueous suspension of the ore is placed. Substances supporting the formation of bubbles of a suitable surface tension were added to the suspension in order to intensify the process of adhesion. Despite the fact that some of these methods are ecological methods, they are applied marginally due to their low effectiveness.

The goal of some embodiments of the present disclosure is the elaboration of the method of separating the grains of precious metals, rare-earth metals, precious and semi-precious stones from natural ores in the aquatic environment by means of the phenomenon of adhesion which shall be a fully ecological, cheap process eliminating toxic processes, wholly deprived of defects which existed in previous methods.

The method of separating grains of valuable minerals, precious metals, rare-earth metals, precious and semi-precious stones from natural ores in the aquatic environment by means of the phenomenon of adhesion covering consecutively stages such as:

- initial separation consisting in sieving fractions up to 5000 μm from alluvial (rubble) ore or crushing of primary (rock) ore to a fraction causing the separation of valuable minerals from gangue and, where appropriate, separating ferromagnetics from ores by means of a known method;
- forming the suspension by mixing the initially separated fraction of ore with liquid;
- adsorption of valuable minerals from the suspension on the adhesive coating of the separator and also recovering water from the process;
- desorption of particles of valuable minerals from the adhesive coating;

according to the present disclosure is characterised by the fact that lanolin or its mixture with additives is used for the formation of the adhesive coating akin to valuable minerals in the separator, whereby, the content of lanolin in the mixture may not be less than 80%.

Adhesive materials akin to grains of valuable minerals such as wax or natural oil are favourably used as additives. Other substances improving the process parameters like for example reological properties or water jet erosion resistance of the ore suspension can also be used as additives.

The adhesive coating containing 100% of lanolin is favourably applied on the surface of the separator after prior warming up of lanolin to a temperature from 36° C. to 170° C. and then after removing the excess of lanolin, the separator is cooled until the adhesive coating solidifies on the surfaces of the separator.

The adhesive coating with the use of lanolin as a component of the mixture with added adhesive material akin to grains of valuable minerals or with at least one additive improving the process parameters is favourably applied on surfaces of the separator after the prior warming up of the mixture to a temperature ensuring the melting of its components and then after removing the liquid mixture, the separator is cooled until the adhesive coating on the working surfaces of the separator solidifies.

The heated lanolin or its mixtures are favourably applied on the working surfaces of the separator by means of a flux or immersion or spraying.

The adsorption process of valuable minerals from the suspension is favourably conducted on a continuous basis via the flow of the suspension through the separator.

The suspension flowing through the separator is favourably saturated.

Desorption is favourably conducted at a temperature equal to or above the melting point of lanolin or its mixtures.

Desorption is favorably conducted by using the heated water or ethanol or another solvent selected to the composition of the mixture causing the adhesive coating to dilute and flow from the separator together with valuable minerals. The desorption may also be carried out by using a gas factor heated to a temperature at which the adhesive surface melts. In case of a separator having its own heating system, the desorption can be carried out without using desorption agents by raising the temperature of the separator above the melting threshold of the adhesive coating.

Favourably valuable minerals from the dissolved adhesive coating are separated in the sedimentation tank in the presence of the liquid with a specific gravity greater than the specific gravity of lanolin or its mixtures.

Lanolin or its mixtures,
the liquid used in desorption
favourably recovered during the separation process
are directed to be reused in the process.

Unexpectedly it turned out that the new application of lanolin as adhesive material akin to grains of valuable minerals gives very good results in the separation process of valuable minerals. The coating of the separator made of lanolin is characterized by relatively high adhesive bond strengths of grains of valuable minerals and a very high selectivity of (distinguishing) grains of valuable minerals in relation to the other grains of the ore. The coating is highly resistant to the waterjet erosion of the ore suspension. Additionally, lanolin enables the application of a simple method of forming adhesive adsorption coatings and a simple method of desorbing minerals recovered on the coatings.

The suspension flow through the separator and the saturation of this suspension improves the efficiency of the process of recovering valuable minerals.

The method according to the present disclosure is fully ecological, based on processes and agents not polluting the environment and at the same time it is a simple and cheap process, deprived of technological defects that have occurred in other processes until now.

The present disclosure was presented in the below embodiments and on the diagram where FIG. 1 presents the chart of a sample process.

EXAMPLE I

The method of separating grains of valuable minerals, precious metals, rare-earth metals, precious and semi-precious stones from natural ores in the aquatic environment by means of the phenomenon of adhesion was presented in the example of the alluvial deposit located in Bulgaria with a content of ca. 2 grams of gold per 1 ton of ore, whereby, gold granulation oscillated between a few micrones and a few millimeters.

1 fraction of grains below 3 mm was rinsed on the sifter screen from 100 kg of ore used for the tests. This fraction underwent magnetic separation in separator 2 to remove the ferromagnetic grains. In other embodiments, the magnetic separation process may be omitted, if the deposit does not contain ferromagnetic grains.

Subsequently such purified ore fraction was placed in tank 3 to which water from tank 4 was poured. In this way a 150 litres suspension was formed in tank 3 containing ca. 50 kg of ore fractions with a grain size below 3 mm (ca. 30 litres) and ca. 120 litres of water.

The suspension flowed to separator 5 prepared in advance using the phenomenon of adhesion for separating the gold grains. Separator 5 should ensure a large adsorption surface area and a suitable turbulent flow of the suspension. By maintaining these conditions, separator 5 may have any structure. A great adsorption surface area may be obtained via a suitable profiling of elements 6 of separator 5, eg. channels, tiles, protrusions or by placing inside the separator elements in the form of blocks of a suitably chosen shape. The turbulent flow may for instance be supported by introducing a gaseous medium during the suspension flow, for example via saturation of the ore suspension. Separator 5 was used for the tests in the form of a pipe with a rectangular cross-section 7×3 cm and a height of 180 cm, inside of which elements 6 were profiled in the form of flow channels with a pattern similar to the herringbone pattern. Separator 5 was produced in the 3D print technology. This technology enables to obtain any pattern of elements 6, which may be applied in other embodiments, provided that the pattern ensures a suitable flow of the suspension when ore grains have extensive contact with the surfaces onto which an adhesive coating is applied. Separator 5 in this embodiment is situated vertically, whereby, in other embodiments separator 5 may be tilted at a chosen angle, ensuring the flow of the suspension. For covering the interior of separator 5 placed in tank 7 with an adhesive coating, two litres of liquid lanolin with a temperature of 80° C. were used. Lanolin prepared in such a way was poured to a separator closed at the bottom and left for 3 minutes. After opening the bottom valve 8 of the separator 5 a significant part of lanolin flowed out to tank 9, situated below separator 5 from where it was passed on for reuse to tank 7, whereas, some of the lanolin deposited on elements 6 and the walls inside separator 5. Subsequently, the interior of separator 5 was cooled to a temperature of 10° C. Then the ore suspension from tank 3 was fed to the inlet of separator 5 placed in its upper part, from where gravitationally it started flowing through separator 5 with valve 10 opened at the bottom. During the process of feeding the suspension to separator 5, a device was applied in the form of the Venturi injector tube 11, which produces microbubbles from atmospheric air. The flowing ore suspension was saturated with micro air bubbles intensifying the adsorption process. In other embodiments another neutral gaseous medium may be applied or another method of producing bubbles or the bubble saturation process may be omitted. During the flow of the suspension, measurements of the adsorption capacity of separator 5 were carried out by testing the composition of the suspension after passing through separator 5. Detector 12 for detecting grains in the outflowing ore suspension was applied in order to determine the efficiency of the separator consisting in capturing nearly 100% of grains of valuable minerals from the ore during the flow. This method is also applied to establish the saturation point (the degree of covering the adsorption surface of the separator, after which the grains pass through the separator). Water together with the ore from which valuable minerals were separated, flowed into tank 13 from where, after the formation of the ore deposit at the bottom, it was transported to tank 4 to be reused.

For the purpose of desorption the desorptive liquid, i.e. water at a temperature of 80° C. was introduced from tank 14 to the inlet of separator 5. Under the influence of temperature lanolin was rinsed together with the deposited grains of valuable minerals to sedimentation tank 15, placed under separator 5, whereupon the lanolin suspension and water (desorptive liquid) were cooled to a temperature of 10° C. and then lanolin was collected from the surface of the desorptive liquid and transferred to tank 7 in order to be reused. Similarly, the desorptive liquid from tank 15, which remained beneath the anolin surface, was transferred to tank 14 in order to be reused.

The separated valuable minerals remained at the bottom of the sedimentation tank 15, from where they were directed to further processing.

After conducting the test, it turned out that ca. 95% of gold grains contained in the tested ore became deposited on the adhesive coating. The selectivity of grains of valuable minerals amounted to over 70%, whereby, selectivity is defined as a percentage of valuable minerals in the entire mass of minerals deposited on the coating.

EXAMPLE II

The same method as in the first example, whereby, 97% of lanolin with 3% of beeswax was used to form the adhesive coating.

After conducting this test, it turned out that ca. 80% of gold grains contained in the tested ore became deposited on the adhesive coating. The selectivity of grains of valuable minerals remained at the level of 70%.

EXAMPLE III

The same method as in example I or II, whereby, hot air was used as an agent dissolving the adhesive coating and the liquid for the precipitation of lanolin or its mixture was introduced to sedimentation tank 15.

After conducting this test, it turned out that the desorption time has increased from 1 minute to 50 minutes.

After conducting the tests with other components of the mixture and different proportions of these mixtures and also after applying different solvents for desorption, it turned out that the use of pure lanolin and water for desorption as adhesive material gives the best results, however, the present disclosure proves to be useful also for other process parameter ranges indicated in the essence of the solution, giving unexpected results, among others, in the efficiency of the process.

The tests of the main parameters of the adsorption method of precious grains tested in other test systems with the use of pure lanolin gave the following results:

the selectivity of grains of valuable minerals captured on the adhesive coating exceeds 70% with a lower profitability threshold of the method amounting to ca. 0.1%;

the adhesive bonding strengths make it possible to keep over 99% of adsorbed grains on the coating.

the resistance of the coating to erosion of the aqueous ore suspension amounts to over 150 hours. In the industrial use, you can assume the desorption of recovered grains every 24 hours, which means removing and applying a new coating every 24 hours.

wide temperature range for applying the coating and desorption, i.e. from 36° C. to 170° C., at which lanolin does not lose its properties.

the temperature range at which the unobstructed adsorption process occurs from the freezing point of the aqueous ore suspension to a temperature of 35° C.

The invention claimed is:

1. A method of separating grains of valuable minerals, precious metals, rare-earth metals, precious and semi-precious stones from natural ores in the aquatic environment by means of the phenomenon of adhesion, comprising: initial separation consisting of sieving fractions up to 5000 μm from alluvial (rubble) ore or crushing primary (rock) ore to a fraction causing the separation of valuable minerals from gangue; forming a suspension by mixing the initially separated fraction of ore with water; adsorption of valuable minerals from the suspension on an adhesive coating and also recovering water from the process; wherein lanolin or its mixtures with additives are used to form the adhesive coating on surfaces on the separator; and desorption of particles of valuable minerals from the adhesive coating; wherein the content of lanolin in the mixtures is not less than 80%.

2. The method according to claim 1, wherein adhesive materials akin to grains of valuable minerals including: wax; or natural oil are applied as additives.

3. The method according to claim 1, wherein the adhesive coating containing 100% of lanolin is applied to the surface of the separator after previously heating lanolin to the temperature from 36° C. to 170° C. and then after removing the excess of lanolin the separator is cooled down until the adhesive coating solidifies on the working surfaces of the separator.

4. The method according to claim 1, wherein the adhesive coating with the use of lanolin as a component of the mixture with added adhesive material akin to grains of valuable minerals is applied to the working surfaces of the separator after previously heating up the mixture to a temperature ensuring the melting of its components and then after removing the excess of the liquid mixture the separator is cooled down until the adhesive coating solidifies on the working surfaces of the separator.

5. The method according to claim 3, wherein the heated lanolin or its mixture is applied to the working surfaces of the separator by the flow of liquid lanolin or its mixture through the separator or by spraying working surfaces of the separator or by immersing the surface of the separator in liquid lanolin or its mixtures.

6. The method according to claim 1, wherein the adsorption process of valuable minerals from suspension is conducted in a continuous manner by the flow of the suspension through the separator.

7. The method according to claim 1, wherein the suspension is saturated.

8. The method according to claim 1, wherein desorption is carried out at a temperature equal to or higher than the melting point of lanolin or its mixtures.

9. The method according to claim 1, wherein desorption is carried out with heated water.

10. The method according to claim 1, wherein desorption is carried out using another heated solvent selected to the composition of the mixture, causing dissolution and outflow of the adhesive coating from the separator together with valuable minerals.

11. The method according to claim 1, wherein desorption is carried out using a gaseous medium heated to a temperature causing the adhesive surface to melt.

12. The method according to claim 1, wherein desorption is carried out in a separator equipped with its own heating system.

13. The method according to claim 1, wherein during the desorption process valuable minerals from the dissolved adhesive coating are separated in the sedimentation tank in the presence of liquid with a specific gravity higher than the specific gravity of lanolin or its mixtures.

14. The method according to claim 1, wherein lanolin or its desorption recovered in the process is directed for reuse in the process.

15. The method according to claim 1, wherein the liquid used in desorption recovered in the process is directed for reuse in the process.

16. The method according to claim 1, further comprising separating ferromagnetics from ores.

* * * * *